United States Patent
Hou et al.

(10) Patent No.: US 9,159,112 B2
(45) Date of Patent: Oct. 13, 2015

(54) DIGITAL WATERMARKING USING SATURATION PATTERNS

(75) Inventors: Hui-Man Hou, Beijing (CN); Jian-Ming Jin, Beijing (CN); Yuhong Xiong, Beijing (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 189 days.

(21) Appl. No.: 13/823,562

(22) PCT Filed: Sep. 16, 2010

(86) PCT No.: PCT/CN2010/076982
§ 371 (c)(1),
(2), (4) Date: Mar. 14, 2013

(87) PCT Pub. No.: WO2012/034280
PCT Pub. Date: Mar. 22, 2012

(65) Prior Publication Data
US 2013/0188824 A1    Jul. 25, 2013

(51) Int. Cl.
G06K 9/00 (2006.01)
H04N 1/40 (2006.01)
G06T 1/00 (2006.01)
H04N 1/32 (2006.01)

(52) U.S. Cl.
CPC ............... G06T 1/0021 (2013.01); G06T 1/005 (2013.01); H04N 1/32213 (2013.01); H04N 1/32251 (2013.01); H04N 1/32309 (2013.01); G06T 2201/0051 (2013.01); G06T 2201/0061 (2013.01)

(58) Field of Classification Search
None
See application file for complete search history.

(56) References Cited

U.S. PATENT DOCUMENTS

| | | | | |
|---|---|---|---|---|
| 4,783,838 A | * | 11/1988 | Matsunawa | 382/271 |
| 5,204,948 A | * | 4/1993 | Kato | 358/520 |
| 5,946,414 A | * | 8/1999 | Cass et al. | 382/183 |
| 6,141,441 A | * | 10/2000 | Cass et al. | 382/166 |
| 6,438,251 B1 | * | 8/2002 | Yamaguchi | 382/100 |
| 6,590,996 B1 | | 7/2003 | Reed et al. | |
| 6,873,711 B1 | * | 3/2005 | Murakami et al. | 382/100 |
| 7,334,247 B1 | | 2/2008 | Finseth et al. | |
| 7,953,275 B1 | * | 5/2011 | Wolfram | 382/167 |
| 2001/0030759 A1 | * | 10/2001 | Hayashi et al. | 358/1.9 |
| 2002/0114490 A1 | * | 8/2002 | Taniguchi et al. | 382/100 |

(Continued)

FOREIGN PATENT DOCUMENTS

| | | |
|---|---|---|
| CN | 101297320 | 10/2008 |
| JP | 2002281283 | 9/2002 |
| JP | 2008067233 | 3/2008 |

OTHER PUBLICATIONS

"Watermark in color image," Ren-Junn Hwang et al, Proceedings of the first International Symposium on Cyber Worlds, pp. 225-229, 2002.*

(Continued)

Primary Examiner — Wenpeng Chen
(74) Attorney, Agent, or Firm — Dhand Law

(57) ABSTRACT

An example method includes dividing the image into blocks of pixels of a predefined size; for each block, selecting one of a plurality of saturation patterns representing a binary value of one or more bits of digital watermark data corresponding to the block; and for each block, embedding the binary value of the one or more bits of corresponding digital watermark data into the block by adjusting the saturation of pixels within the block in accordance with the selected pattern.

10 Claims, 5 Drawing Sheets

(56) References Cited

U.S. PATENT DOCUMENTS

| | | | | |
|---|---|---|---|---|
| 2004/0165747 | A1* | 8/2004 | Shibaki et al. | 382/100 |
| 2005/0116029 | A1* | 6/2005 | Miki et al. | 235/380 |
| 2006/0251330 | A1* | 11/2006 | Toth et al. | 382/236 |
| 2008/0056529 | A1* | 3/2008 | Bhattacharjya | 382/100 |
| 2008/0089552 | A1* | 4/2008 | Nakamura et al. | 382/100 |
| 2008/0212141 | A1* | 9/2008 | Moroo et al. | 358/3.28 |
| 2009/0136082 | A1 | 5/2009 | Zandifar et al. | |
| 2009/0323125 | A1* | 12/2009 | Kawakami | 358/3.28 |
| 2010/0142003 | A1* | 6/2010 | Braun et al. | 358/3.28 |

OTHER PUBLICATIONS

"Saturation Adjustment Scheme of Blind Color Watermarking for Secret Text Hiding", Chih-Chien Wu et al, Journal of Multimedia, vol. 5, No. 3, Jun. 2010, pp. 248-258.*

Recent Trends in Color Image Watermarking, Alain Trémeau et al, Journal of Imaging Science and Technology 53(1), Jan.-Feb. 2009, pp. 010201-1 to 010201-15.*

"Robust spatial watermarking technique for colour images via direct saturation adjustment," P.S. Huang, et al. IEE Proc.—Vis. Image Signal Process., vol. 152, No. 5, Oct. 2005, pp. 561-574.*

PCT Search Report~Application No. PCT/CN2010/076982 dated Jun. 23, 2011~pp. 3.

Zhang et al., "Color image watermarking based on HSI space", Journal of Sichuan University (Natural Science Edition). Feb. 2008, vol. 45, No. 1, pp. 76-78.

Alain Tremeau et al, Recent Trends in Color Image Watermarking (Research Paper), Publication Date: Jan.-Feb. 2009, 1 Page.

Heather Wood, Invisible Digital Watermarking in the Spatial and DCT Domains for Color Images (Research Paper), Retrieved Jun. 5, 2015, 5 Pages.

P.S. Huang et al, Robust Spatial Watermarking Technique for Colour Images Via Direct Saturation Adjustment (Research Paper), Publication Date: Oct. 2005, vol. 152, 3 Pages.

Hee-Soo Kim et al, Digital Watermarking Based on Color Differences, Security and Watermarking of Multimedia Contents III, Ping Wah Wong, Edward J. Delp III, Editors, Proceedings of SPIE vol. 4314 (2001) SPIE., 0277-786X/01/$15.00, 8 Pages.

* cited by examiner

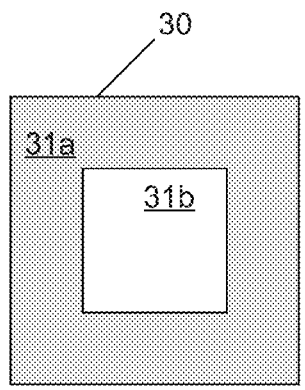
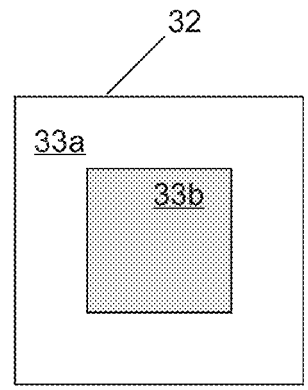
Figure 2a        Figure 2b
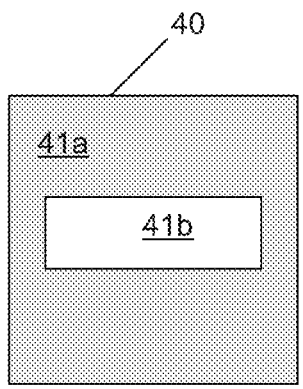
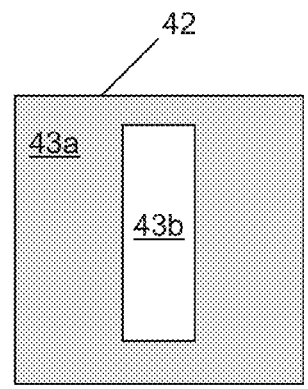
Figure 3a        Figure 3b
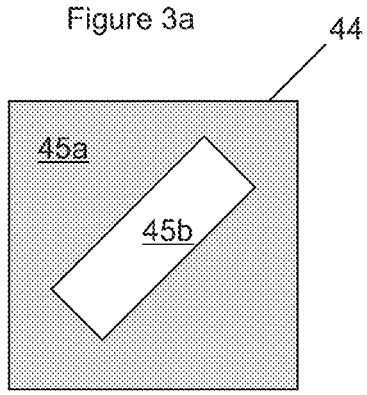
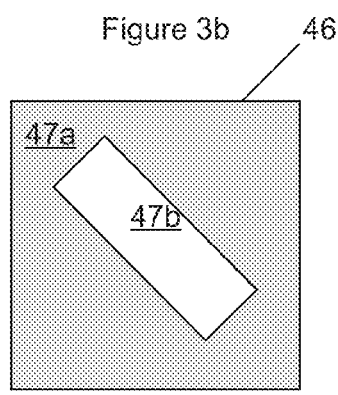
Figure 3c        Figure 3d

DIGITAL WATERMARKING USING SATURATION PATTERNS

BACKGROUND

Digital image watermarking methods are used to embed information into a digital image. In some cases, the watermark should be visible, for example if it is a copyright notice or the like. In other cases, it is desirable that the watermark is imperceptible to a human observer so that the watermarking method can be used for steganographic purposes.

Traditional digital image watermarking methods add the information to be embedded to the middle frequency coefficients of the discrete cosine transform domain in a greyscale image or to the luminance domain of a colour image.

Applications of imperceptible digital watermarking include copyright protection systems, in which a device analyses a watermark retrieved from the digital signal to be copied before deciding whether the copy should be made depending on the analysis. Another application is source tracing, in which a unique watermark is embedded into a digital signal identifying a point of origin. If a copy is found then the unique watermark can be retrieved from the copy and used to identify the point of origin.

BRIEF DESCRIPTION OF THE DRAWINGS

Embodiments will now be described with reference to the accompanying drawings, in which:

FIGS. 2*a* and 2*b* show a first set of saturation patterns for use in the method of FIG. 1;

FIGS. 3*a* to 3*d* show a second set of saturation patterns for use in the method of FIG. 1;

DETAILED DESCRIPTION

As can be seen from the above discussion, a key feature of a digital watermarking method is the perceptibility of the watermark. Specifically, for watermarking methods that are to be used for steganographic purposes, the watermark should be imperceptible.

Another key requirement is that the watermark should be robust. In other words, it should still be possible to extract the watermark after the digital signal has been through a variety of processing steps.

However, the traditional techniques mentioned above are not suitable for images that will go through printing and scanning processes or, in particular, for images that will be captured by photographic processes. All of these processes will result in an image that is considerably different to the original, for instance due to the addition of noise. It has been found that to make watermarks applied using traditional techniques sufficiently robust that they survive such processing, it is necessary to increase the intensity of the watermark to the point where it becomes perceptible to a human observer.

In one embodiment, there is provided a method for embedding, using a processor, digital watermark data into image data representing a number of pixels, each of which has respective saturation values, the method comprising the following steps:

a) using said processor, dividing the image into blocks of pixels of a predefined size;

b) for each block, using said processor to select one of a plurality of saturation patterns representing the binary value of one or more bits of the digital watermark data corresponding to the block; and c) for each block, using said processor to embed the binary value of the one or more bits of corresponding digital watermark data into the block by adjusting the saturation of pixels within each block in accordance with the selected pattern.

This embodiment exploits the fact that the human eye is inherently less sensitive to changes in saturation than it is to changes in luminance. However, such changes can be detected by digital cameras and scanners. Thus, by changing the saturation within the blocks it is possible to embed a watermark that is not perceptible to human beings but that is robust to a variety of processes, including printing, scanning and capture by digital photography.

Typically, the image data is greyscale image data.

Figure 1:
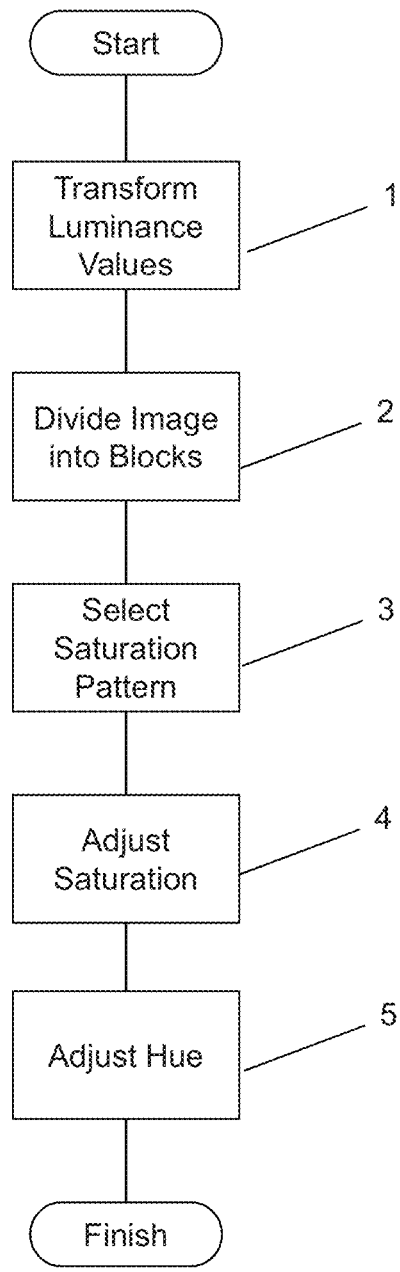
FIG. 1 shows a flowchart for a method for embedding digital watermark data into greyscale image data.

FIG. 1 shows a flowchart for a method for embedding digital watermark data into greyscale image data. The first step 1 in this method is to transform the luminance values of the pixels in the greyscale image data so that each of the luminance values falls within a predefined range of luminance values. In this embodiment, the predefined range of luminance values includes a lower limit that is higher than zero and an upper limit that is lower than a full scale luminance value.

Changes in saturation are visible to a human observer at high luminance values, whereas changes in saturation at very low luminance values are very difficult to detect. The purpose of this transformation is therefore to map luminance values into a region where changes of saturation remain imperceptible to a human observer and can be detected by a machine. Thus, the range of luminance values is transformed from the original upper and lower limits of 0 to 255 to new upper and lower limits of $t_1$ to $t_2$ respectively. A typical value for $t_1$ is 50 and for $t_2$ is 200. Many mathematical functions may be used to perform the transformation. In one example, luminance values lower than $t_1$ are set to $t_1$ and luminance values higher than $t_2$ are set to $t_2$.

Thus, the luminance values of the pixels in the image data may be transformed such that each luminance value lower than the lower limit of the predefined range of luminance values is set to the lower limit and each luminance value higher than the upper limit of the predefined range of luminance values is set to the upper limit.

Then, in step 2, the transformed image data is divided into non-overlapping square blocks with T pixels on each side. A typical value for T is 16 pixels. Each of these blocks will be used to store one or more bits of watermark information separately.

In step 3, one of a plurality of saturation patterns is selected to represent one or more bits of watermark data. This step will be repeated until saturation patterns have been selected to represent every bit of the watermark data. Each of the patterns is a square block of pixels with T pixels on each side to match the blocks that the greyscale image data has been divided into. A first example of a pair of suitable saturation patterns is shown in FIGS. 2*a* and 2*b*.

In FIG. 2*a*, a first pattern 30 representing a binary zero has a set of pixels forming its perimeter 31*a* that have saturation values higher than those pixels forming a central region 31*b*. In FIG. 2*b*, a second pattern 32 representing a binary one has a set of pixels forming its perimeter 33a that have saturation values lower than those pixels forming a central region 33b.

In reality, in patterns 30 and 32 the saturation will gradually change from the perimeter 31a, 33a to the centre 31b, 33b, but step changes are shown in the figures for ease of illustration. The mechanism used to cause the gradual change will be explained below.

For embedding a binary zero of watermark data the first pattern 30 will be selected, whereas to embed a binary one of watermark data the second pattern 32 will be selected. Of course, the assignment of binary values to the first and second patterns 30 and 32 is arbitrary, and in other embodiments the first pattern 30 could represent a binary one whilst the second pattern 32 could represent a binary zero.

Thus, the plurality of saturation patterns may comprise a first saturation pattern in which the saturation of pixels is graduated from the perimeter of the block to the centre such that pixels at the centre have a higher saturation and a second saturation pattern in which the saturation of pixels is graduated from the perimeter of the block to the centre such that pixels at the centre have a lower saturation, each of the first and second saturation patterns representing a different one of a binary one and a binary zero.

FIGS. 3a to 3d show another scheme of saturation patterns for representing the watermark data. In these an elongate central region is positioned in one of four orientations relative to the perimeter so that the four saturation patterns can represent four different values.

In FIG. 3a, a first pattern 40 comprises a set of pixels forming a perimeter region 41a in which an elongate central region 41b is oriented horizontally so as to extend between opposing sides of the pattern 40. A second pattern 42 is shown in FIG. 3b and comprises a set of pixels forming a perimeter region 43a in which an elongate central region 43b is oriented vertically so as to extend between opposing sides of the pattern 42. The two elongate central regions 41b and 43b are disposed orthogonally to one another.

In FIG. 3c, a third pattern 44 comprises a set of pixels forming a perimeter region 45a in which an elongate central region 45b is oriented diagonally so as to extend between diagonally opposing corners of the pattern 44. A fourth pattern 46 is shown in FIG. 3d and comprises a set of pixels forming a perimeter region 47a in which an elongate central region 47b is oriented diagonally so as to extend between diagonally opposing corners of the pattern 46. The two elongate central regions 45b and 47b are disposed orthogonally to one another.

Between them, the four patterns 40, 42, 44, 46 shown in FIGS. 3a to 3d can represent the four binary values 00, 01, 10, 11. Therefore, they can be used to embed the watermark data into the greyscale image data at a higher density than the simpler patterns 30, 32 shown in FIGS. 2a and 2b. Of course, it is arbitrary which of the four patterns 40, 42, 44, 46 represents each of the four binary values 00, 01, 10, 11.

Again, in patterns 40, 42, 44 and 46 the saturation will gradually change from the perimeter 41a, 43a, 45a, 47a to the centre 41b, 43b, 45b and 47b but step changes are shown in the figures for ease of illustration. Of course, the change in saturation could be such that the centres 41b, 43b, 45b and 47b are more highly saturated than the perimeters 41a, 43a, 45a, 47a if desired.

Thus, the plurality of saturation patterns may comprise first to fourth saturation patterns in which the saturation of pixels is graduated from the perimeter of the block to the centre to define an elongate region in which the pixels have differing saturation values to the pixels in the perimeter of the block, the elongate regions of the first and second saturation patterns extending between opposing sides of the block and being orthogonal to each other, and the elongate regions of the third and fourth saturation patterns extending between diagonally opposing corners of the block and being orthogonal to each other, wherein each of the first to fourth saturation patterns represents a respective one of the binary values: 00, 01, 10, 11.

When suitable saturation patterns have been selected to represent watermark data then step 4 is performed, in which the saturation values of the blocks into which the greyscale image data was divided in step 2 are adjusted in accordance with the saturation patterns.

In order to adjust the saturation value for each block, an original saturation (os) value is first calculated. This depends on the average luminance value of the pixels within the block such that the value of os is low for a high average luminance value and the value of os is high for a low average luminance value. A suitable formula for calculating a value for os is:

$$os = s_1 - (alv - t_1) \cdot \frac{(s_1 - s_2)}{(t_2 - t_1)}$$

where alv is the average luminance value of the pixels in the block, $s_1$ is a constant representing the saturation at a luminance value of $t_1$ (the lower limit of the transformed luminance range), and $s_2$ is a constant representing the saturation at a luminance value of $t_2$ (the upper limit of the transformed luminance range). Typical values for $s_1$ and $s_2$ are 0.7 and 0.2 respectively. The relationship defined by the equation for os is shown by the line labelled os in FIG. 4. Setting a value for os depending on the average luminance value in this way means that changes in saturation are not particularly apparent to a human observer.

Figure 4:
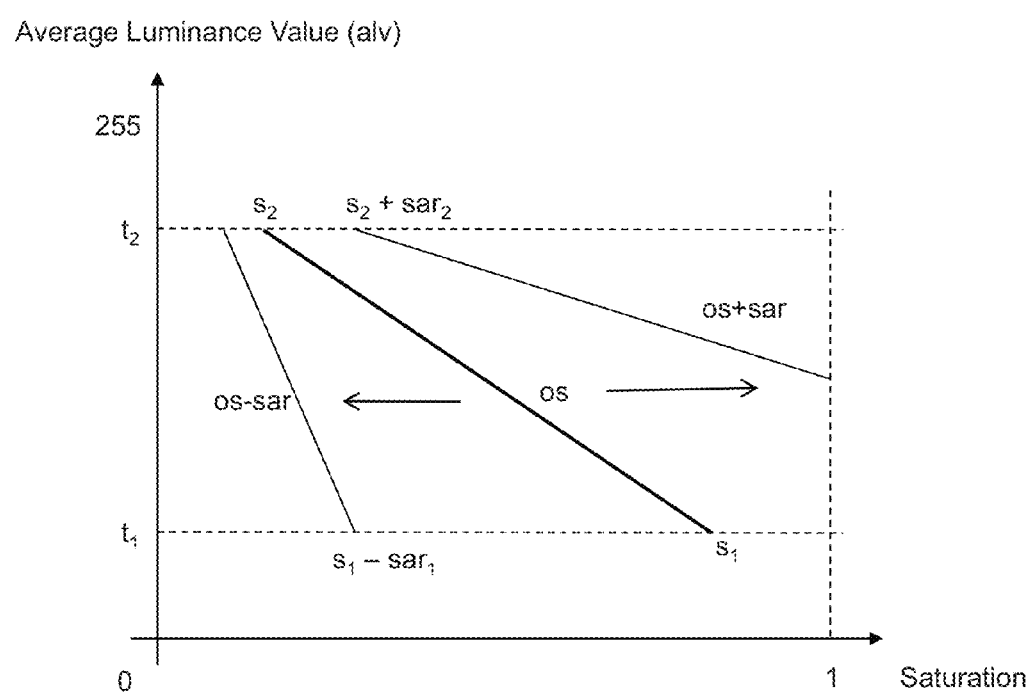
FIG. 4 shows a plot of various relationships between luminance and saturation values for use in the method of FIG. 1.

It is then necessary to calculate a saturation adjustment range, sar. It is easier for a human observer to detect changes in saturation at high luminance values than it is at low luminance values. Therefore, a formula for calculating sar that depends on the average luminance value of the block, resulting in a larger adjustment at low luminance values is used. A suitable formula is:

$$sar = sar_1 - (alv - t_1) \cdot \frac{(sar_1 - sar_2)}{(t_2 - t_1)}$$

where $sar_1$ and $sar_2$ represent values of sar when alv is equal to the $t_1$ and $t_2$ luminance values respectively. Typical values for $sar_1$ and $sar_2$ are 0.5 and 0.1 respectively. FIG. 4 shows the relationship between saturation and luminance for os+scr and os−scr. As can be seen, the change from the original saturation value, os, is much larger at low luminance values than it is at higher values.

Once the value for sar has been calculated for a block, its saturation can be adjusted by graduating the saturation in accordance with the saturation pattern selected for that block. The result of the graduation is that at the centre of the block, the saturation values of the pixels should be os+sar if the saturation at the centre of the block is to increase (as in FIG. 2b). On the other hand, the saturation values of the pixels at the centre of the block should be os−sar if the saturation at the centre of the block is to decrease (as in FIG. 2a). The saturation therefore gradually varies from os a the perimeter to os+sar or os−sar at the centre as appropriate.

Thus, the degree of adjustment of the saturation of pixels within each block may be determined by calculating an original block saturation value (os) using the following formula;

$$os = s_1 - (alv - t_1) \cdot \frac{(s_1 - s_2)}{(t_2 - t_1)}$$

where alv is the average luminance value, $t_1$ and $t_2$ are lower and upper limits of a range of luminance values of the image data, and $s_1$ and $s_2$ represent values of os when alv is equal to the $t_1$ and $t_2$ luminance values respectively; and then calculating a saturation adjustment range using the following formula:

$$sar = sar_1 - (alv - t_1) \cdot \frac{(sar_1 - sar_2)}{(t_2 - t_1)}$$

where sar is the saturation adjustment range, and $sar_1$ and $sar_2$ represent values of sar when alv is equal to the $t_1$ and $t_2$ luminance values respectively, the degree of adjustment being equal to the value of sar.

The graduation is performed by calculating the hue, saturation and intensity (HSI) colour vector for each pixel (the hue and saturation being zero for greyscale pixels) from its red, green, blue (RGB) value. The saturation is then gradually increased from os at the perimeter to os+scr or os−scr at the centre.

In this way, the digital watermark data is embedded into the saturation value of the greyscale image data in a manner that is imperceptible to human observers but can be detected by a machine.

The final step is to adjust the hue of each pixel in the greyscale image data. This is done in step 5 of FIG. 1. A cyan hue is selected because human eyes are not particularly sensitive to this colour. Using the cyan hue, adjusted saturation values and original luminance values, a new HSI vector is formed for each pixel, which is used to calculate a new RGB value for each pixel.

Thus, the method may further comprise adjusting a hue value for each pixel in the image data to a predefined value.

In another embodiment, there is provided a method for extracting, using a processor, digital watermark data embedded in image data representing a number of pixels, each of which has a respective saturation value, the method comprising the following steps:
a) using said processor, dividing the image into blocks of pixels of a predefined size;
b) for each block, using said processor to compare the saturation of pixels within the block with a plurality of saturation patterns, each representing a different binary value, and to select a matching saturation pattern that most closely matches the saturation of pixels within the block; and
c) for each block, using said processor to assign the binary value represented by the matching saturation pattern to one or more bits of the digital watermark data corresponding to the block.

Figure 5:
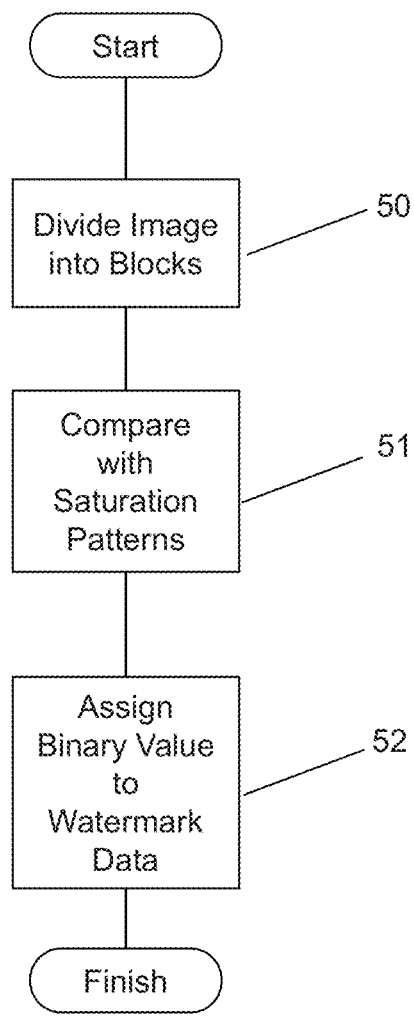
FIG. 5 shows a flow chart of a method for extracting digital watermark data embedded in image data.

The method provides a way of recovering watermark data that has been embedded in image data using the method described above in relation to FIG. 1. A flowchart illustrating the method of recovering the watermark data is shown in FIG. 5.

Prior to performing the method of extraction, image data is first captured. The image data may be captured using a scanner or a digital camera, or it may simply be an image file (for example a JPEG file). If captured by scanner or digital camera then the image data may have been printed after the watermark data has been embedded using the method described above with reference to FIG. 1.

In step 50, the image data containing the watermark data to be extracted is divided into square, non-overlapping blocks. These blocks will be the same size as the blocks into which the image was divided during the embedding process (step 2 of FIG. 1). Thus, a typical size is 16×16 pixels.

Each of these blocks is then compared in step 51 with a set of saturation patterns to find which of these most closely matches the saturation of the pixels within the block. For example, to compare with the saturation patterns of FIGS. 2a and 2b, the average saturation of the central T/2×T/2 (i.e. 8×8 pixels for a 16×16 pixel block) can be compared with the average saturation of the remaining pixels on the perimeter surrounding the central pixels. If the average saturation of the central pixels is lower than the average saturation of the perimeter pixels then the block can be said to match the pattern 30 of FIG. 2a. If, on the other hand, the average saturation of the central pixels is higher than the average saturation of the perimeter pixels then the block can be said to match the pattern 32 of FIG. 2b.

When the blocks have each been matched to saturation patterns then, in step 51, the corresponding binary value of each saturation pattern can be assigned in step 52 to the respective bits of the binary watermark data. For example, if a block matches the saturation pattern 30 of FIG. 2a then a binary zero can be assigned, whereas if the block matches the saturation pattern 32 of FIG. 2b then a binary one can be assigned. In this way, the watermark data can be reconstituted.

Thus, the plurality of saturation patterns may comprise a first saturation pattern in which the average saturation of an outer group of pixels disposed around the perimeter of the block is lower than the average saturation of an inner group of pixels surrounded by the first group of pixels, and a second saturation pattern in which the average saturation of an outer group of pixels disposed around the perimeter of the block is higher than the average saturation of an inner group of pixels surrounded by the first group of pixels, each of the first and second saturation patterns representing a different one of a binary one and a binary zero.

Alternatively, the plurality of saturation patterns may comprise first to fourth saturation patterns in which an outer group of pixels disposed around the perimeter of the block surrounds an inner group of pixels defining an elongate region in which the pixels have differing saturation values to the pixels in the outer region, the elongate regions of the first and second saturation patterns extending between opposing sides of the block and being orthogonal to each other, and the elongate regions of the third and fourth saturation patterns extending between diagonally opposing corners of the block and being orthogonal to each other, wherein each of the first to fourth saturation patterns represents a respective one of the binary values: 00, 01, 10, 11.

The above methods for embedding and extracting watermark data can be embodied as computer programs, for example on computer-readable media.

Thus, there is provided a computer program comprising a set of computer-readable instructions adapted, when executed on a computer device, to cause said computer device to embed digital watermark data into image data representing a number of pixels, each of which has respective saturation values, by a method comprising the following steps:
a) using said processor, dividing the image into blocks of pixels of a predefined size;

b) for each block, using said processor to select one of a plurality of saturation patterns representing the binary value of one or more bits of the digital watermark data corresponding to the block; and c) for each block, using said processor to embed the binary value of the one or more bits of corresponding digital watermark data into the block by adjusting the saturation of pixels within each block in accordance with the selected pattern.

In addition, there is provided a computer program comprising a set of computer-readable instructions adapted, when executed on a computer device, to cause said computer device to extract digital watermark data embedded in image data representing a number of pixels, each of which has a respective saturation value, by a method comprising the following steps:

a) using said processor, dividing the image into blocks of pixels of a predefined size;

b) for each block, using said processor to compare the saturation of pixels within the block with a plurality of saturation patterns, each representing a different binary value, and to select a matching saturation pattern that most closely matches the saturation of pixels within the block; and c) for each block, using said processor to assign the binary value represented by the matching saturation pattern to one or more bits of the digital watermark data corresponding to the block.

The above methods for embedding and extracting watermark data can also be embodied in systems for embedding and extracting watermark data.

Thus, there is provided a system comprising a processor and a memory, the processor being adapted to execute a set of computer-readable instructions stored in the memory, thereby to embed digital watermark data into image data representing a number of pixels, each of which has respective saturation values, by a method comprising the following steps:

a) using said processor, dividing the image into blocks of pixels of a predefined size;

b) for each block, using said processor to select one of a plurality of saturation patterns representing the binary value of one or more bits of the digital watermark data corresponding to the block; and c) for each block, using said processor to embed the binary value of the one or more bits of corresponding digital watermark data into the block by adjusting the saturation of pixels within each block in accordance with the selected pattern.

In addition, there is provided a system comprising a processor and a memory, the processor being adapted to execute a set of computer-readable instructions stored in the memory, thereby to extract digital watermark data embedded in image data representing a number of pixels, each of which has a respective saturation value, by a method comprising the following steps:

a) using said processor, dividing the image into blocks of pixels of a predefined size;

b) for each block, using said processor to compare the saturation of pixels within the block with a plurality of saturation patterns, each representing a different binary value, and to select a matching saturation pattern that most closely matches the saturation of pixels within the block; and c) for each block, using said processor to assign the binary value represented by the matching saturation pattern to one or more bits of the digital watermark data corresponding to the block.

Figure 6:
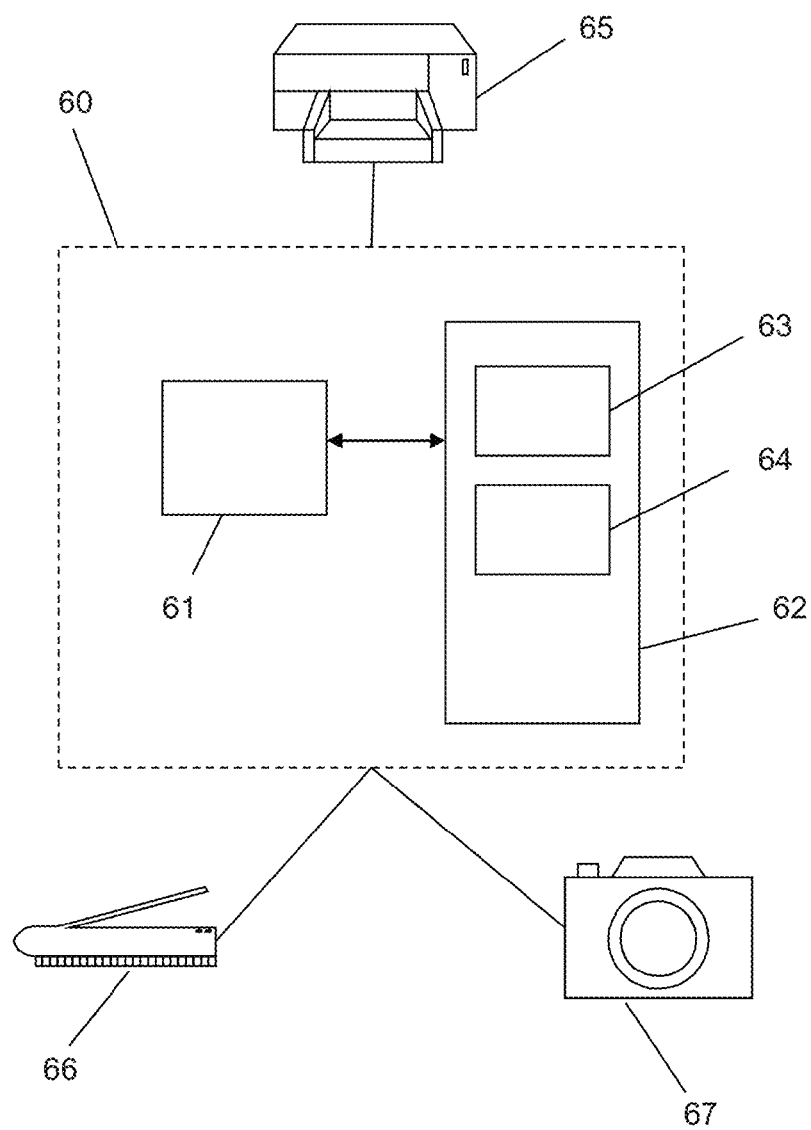
FIG. 6 shows a system for performing the method of FIG. 1 and/or the method of FIG. 5.

Such a system is shown in FIG. 6. Typically, this will be a computer system 60 adapted to perform the method of embedding and/or the method of extracting watermark data described above. The system 60 comprises a processor 61 coupled to memory 62. Within the memory are stored two software modules 63 and 64. The software module 63 comprises computer-readable instructions to enable the processor 61 to perform the method for embedding digital watermark data into greyscale image data described above. The software module 64 comprises computer-readable instructions to enable the processor 61 to perform the method for extracting digital watermark data from image data described above.

The computer system 60 is coupled to a printer 65 for printing an image from image data into which watermark data has been embedded using the above method. The computer system 60 may also be coupled to a network so that image data comprising the watermark data may be transmitted to other computer systems, for example by e-mail. The computer system 60 is also coupled to a scanner 66 and digital camera 67, which provide means by which the software module 64 can capture image data for the purpose of extracting embedded watermark data.

According to one embodiment, a digital image watermarking method based on block saturation adjustment of a greyscale image is disclosed. Since human eyes are more sensitive to luminance information than to chrominance, adjusting the pixels' chrominance value of a greyscale image slightly would not cause evident difference for human visual system. These chrominance adjustments as well as a predefined hue, which are called pseudo colour added to the greyscale image, can hide information. By adjusting the block pixels' saturation value from edge to centre according to pattern selected from a plurality of saturation patterns, one or more bits can be embedded to the block. The saturation adjustments and gradients are generated according to the block characteristics. While comparing the saturation values in each block with the plurality of saturation patterns, the best matched pattern is found and its representing bits form the watermark information, which can be detected from scanners or cameras acquired images.

We claim:

1. A method comprising:
   a) using a processor, transforming luminance values of one or more pixels in image data of an image so that each of the luminance values falls within a predefined range of luminance values;
   b) using said processor, dividing the image into blocks of pixels of a predefined size;
   c) for each block, using said processor to select one of a plurality of saturation patterns representing a binary value of one or more bits of digital watermark data corresponding to the block; and
   d) for each block, using said processor to embed the binary value of the one or more bits of corresponding digital watermark data into the block by adjusting the saturation of pixels within the block in accordance with the selected pattern,
   wherein the predefined range of luminance values includes a lower limit that is higher than zero and an upper limit that is lower than a full scale luminance value.

2. A method according to claim 1, wherein the luminance values of the pixels in the image data are transformed such that each luminance value lower than the lower limit is set to the lower limit and each luminance value higher than the upper limit is set to the upper limit.

3. A method according to claim 1, wherein the plurality of saturation patterns comprises a first saturation pattern in which the saturation of pixels is graduated from the perimeter of the block to the centre such that pixels at the centre have a higher saturation and a second saturation pattern in which the saturation of pixels is graduated from the perimeter of the block to the centre such that pixels at the centre have a lower saturation, each of the first and second saturation patterns representing a different one of a binary one and a binary zero.

4. A method according to claim 1, wherein the plurality of saturation patterns comprises first to fourth saturation patterns in which the saturation of pixels is graduated from the perimeter of the block to the centre to define an elongate region in which the pixels have differing saturation values to the pixels in the perimeter of the block, the elongate regions of the first and second saturation patterns extending between opposing sides of the block and being orthogonal to each other, and the elongate regions of the third and fourth saturation patterns extending between diagonally opposing corners of the block and being orthogonal to each other, wherein each of the first to fourth saturation patterns represents a respective one of the binary values: 00, 01, 10, 11.

5. A method according to claim 1, further comprising adjusting a hue value for each pixel in the image data to a predefined value.

6. A method according to claim 1, wherein the degree of adjustment of the saturation of pixels within each block is determined by calculating an original block saturation value (os) using the following formula:

$$os = s_1 - (alv - t_1) \cdot \frac{(s_1 - s_2)}{(t_2 - t_1)}$$

where alv is the average luminance value, $t_1$ and $t_2$ are lower and upper limits of a range of luminance values of the image data, and $s_1$ and $s_2$ represent values of os when alv is equal to the $t_1$ and $t_2$ luminance values respectively; and then calculating a saturation adjustment range using the following formula:

$$sar = sar_1 - (alv - t_1) \cdot \frac{(sar_1 - sar_2)}{(t_2 - t_1)}$$

where sar is the saturation adjustment range, and $sar_1$ and $sar_2$ represent values of sar when alv is equal to the $t_1$ and $t_2$ luminance values respectively, the degree of adjustment being equal to the value of sar.

7. A method, comprising:
a) using said processor, dividing the image into blocks of pixels of a predefined size;
b) for each block, using said processor to compare the saturation of pixels within the block with a plurality of saturation patterns, each representing a different binary value, and to select a matching saturation pattern that most closely matches the saturation of pixels within the block; and
c) for each block, using said processor to assign the binary value represented by the matching saturation pattern to one or more bits of the digital watermark data corresponding to the block,
wherein the plurality of saturation patterns comprises a first saturation pattern in which the average saturation of an outer group of pixels disposed around the perimeter of the block is lower than the average saturation of an inner group of pixels surrounded by the first group of pixels, and a second saturation pattern in which the average saturation of an outer group of pixels disposed around the perimeter of the block is higher than the average saturation of an inner group of pixels surrounded by the first group of pixels, each of the first and second saturation patterns representing a different one of a binary one and a binary zero.

8. A method, comprising:
a) using said processor, dividing the image into blocks of pixels of a predefined size;
b) for each block, using said processor to compare the saturation of pixels within the block with a plurality of saturation patterns, each representing a different binary value, and to select a matching saturation pattern that most closely matches the saturation of pixels within the block; and
c) for each block, using said processor to assign the binary value represented by the matching saturation pattern to one or more bits of the digital watermark data corresponding to the block,
wherein the plurality of saturation patterns comprises first to fourth saturation patterns in which an outer group of pixels disposed around the perimeter of the block surrounds an inner group of pixels defining an elongate region in which the pixels have differing saturation values to the pixels in the outer region, the elongate regions of the first and second saturation patterns extending between opposing sides of the block and being orthogonal to each other, and the elongate regions of the third and fourth saturation patterns extending between diagonally opposing corners of the block and being orthogonal to each other, wherein each of the first to fourth saturation patterns represents a respective one of the binary values: 00, 01, 10, 11.

9. A system comprising a processor and a memory, the processor to execute a set of computer-readable instructions stored in the memory, the computer-readable instructions including the following steps:
a) using said processor, transforming luminance values of one or more pixels in image data of an image so that each of the luminance values falls within a predefined range of luminance values;
b) using said processor, dividing the image into blocks of pixels of a predefined size;
c) for each block, using said processor to select one of a plurality of saturation patterns representing a binary value of one or more bits of digital watermark data corresponding to the block; and
d) for each block, using said processor to embed the binary value of the one or more bits of corresponding digital watermark data into the block by adjusting the saturation of pixels within the block in accordance with the selected pattern,
wherein the predefined range of luminance values includes a lower limit that is higher than zero and an upper limit that is lower than a full scale luminance value.

10. A non-transitory computer readable medium, comprising a set of computer-readable instructions, when executed on a computer device, to cause said computer device to:
a) transform luminance values of one or more pixels in image data of an image so that each of the luminance values falls within a predefined range of luminance values;
b) divide the image into blocks of pixels of a predefined size;
c) for each block, select one of a plurality of saturation patterns representing a binary value of one or more bits of digital watermark data corresponding to the block; and
d) for each block, embed the binary value of the one or more bits of corresponding digital watermark data into the block by adjusting the saturation of pixels within the block in accordance with the selected pattern,
wherein the predefined range of luminance values includes a lower limit that is higher than zero and an upper limit that is lower than a full scale luminance value.

* * * * *